United States Patent [19]
Keech et al.

[11] Patent Number: 5,465,106
[45] Date of Patent: Nov. 7, 1995

[54] GENERIC DRIVER INTERFACE CARD

[75] Inventors: Kimberly W. Keech, Brea; Robert J. Rothaus, Yorba Linda, both of Calif.

[73] Assignee: Hughes Aircraft Company, Los Angeles, Calif.

[21] Appl. No.: 209,672

[22] Filed: Mar. 10, 1994

Related U.S. Application Data

[63] Continuation of Ser. No. 951,257, Sep. 25, 1992, abandoned.
[51] Int. Cl.⁶ .................................................. G09G 5/00
[52] U.S. Cl. ................................. 345/204; 340/825.83
[58] Field of Search ........................... 345/10, 30, 112, 345/204; 340/825.83; 395/118, 162, 164, 165

[56] References Cited

U.S. PATENT DOCUMENTS 4,935,734  6/1990  Austin .................................. 340/825.83

*Primary Examiner*—Richard Hjerpe
*Assistant Examiner*—Lun-Yi Lao
*Attorney, Agent, or Firm*—Georgann S. Grunebach; Wanda K. Denson-Low

[57] ABSTRACT

A generic driver interface card comprising a configurable digital circuit card that has programmable logic functions and I/O connectors to provide the capability of implementing many new or old circuit designs without re-etching the circuit card. The circuit card utilizes a programmable gate array, a bidirectional programmable I/O driver, and an EEPROM to provide for reconfiguration of the circuit card upon reset. The circuit card is a single versatile circuit card that may be used in many different applications. The logic functions and I/O pins of the circuit card are programmable to allow emulation of old designs and implementation of new designs without the need to physically modify the card. The circuit card utilizes the bidirectional programmable I/O driver to provide a programmable connector with the high current drive capability required to interface with older-generation systems. The circuit card allows design changes without the need to physically modify the circuitry. A single circuit card can emulate many different old designs and can be used for new designs, whereas most circuit cards cannot change their personalities. The configuration program of the circuit card is stored in the EEPROM which has edge-programmability to eliminate the need of removing the EEPROM prior to programming.

9 Claims, 5 Drawing Sheets

GENERIC DRIVER INTERFACE CARD

This is a continuation of application Ser. No. 07/951,257, filed Sep. 25, 1992, now abandoned.

BACKGROUND

The present invention relates generally to digital logic function cards, and more particularly, to a configurable digital circuit I/O card that may be used to provide a multiplicity of input and output functions.

The UYA-4 display console is a 20 year old display system that is currently in use throughout the world. Many digital cards in UYA-4 consoles use "sunset technology" components that are currently unprocurable. In order to redesign the cards used in the UYA-4 consoles that contain unprocurable parts would require high nonrecurring cost and a long lead time.

The digital cards designed for the UYA-4 display console performed specific logic functions with fixed I/O pins assignment. These card designs must go through a complete cycle from design to layout. System design changes require physical modification to circuit cards.

It would therefore be an advantage to have a generic driver interface card that has programmable logic functions and I/O pins to allow emulation of old designs and implementation of new designs. It would also be an advantage to have a generic driver interface card that eliminates the need to physically modify the card when design changes are required, thus eliminating card layout and minimizing design cycle time.

SUMMARY OF THE INVENTION

In order to achieve the above advantages, the present invention provides for a generic driver interface card that comprises a configurable digital circuit card. The generic driver interface card has programmable logic functions and I/O connectors to provide the capability of implementing many new or old designs without re-etching the circuit card. The generic driver interface card utilizes a programmable gate array (PGA), bidirectional programmable I/O drivers (PIO), and an EEPROM to allow reconfiguration upon reset. The generic driver interface card is a single versatile circuit card that may be used in many different applications.

The logic functions and I/O pins of the generic driver interface card are programmable to allow emulation of old designs and implementation of new designs without the need to physically modify the circuit card. This eliminates card layout and minimizes the design cycle for redesigned cards. The present invention provides for a single circuit card that is adapted to replace many circuit cards containing unprocurable parts, and therefore eliminates nonrecurring layout cost and shortens the design cycle.

The advantages of the generic driver interface card are: (1) that it utilizes a bidirectional programmable I/O driver to provide a programmable connector with the high current drive capability required to interface with older-generation systems. The standard I/O connectors from conventional card designs do not provide programing capability; (2) the generic driver interface card allows design changes without the need to physically modify the circuitry; (3) a single generic driver interface card can emulate many different old designs and can be used for new designs, whereas most circuit cards cannot change their personalities; and (4) the configuration program of the generic driver interface card is stored in an EEPROM having edge-programmability to eliminate the need of removing the EEPROM prior to programming.

The genetic driver interface card is capable of replacing over 250 different existing older-generation digital card types without re-etching the circuit card in the UYA-4 consoles. In addition, new designs or design changes may be implemented easily with the genetic driver interface card without nonrecurring engineering layout costs, which shortens the design cycle. The present invention provides for a tremendous cost savings from design to checkout and eliminates the card layout cycle. The generic driver interface card has been proven to emulate old designs in the UYA-4 consoles, and a new design is being implemented for this console. The generic driver interface card solves many problems resulting from the unavailability and unprocurability of parts, and may be used in the UYQ-21 console, for example, and many new and old applications.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
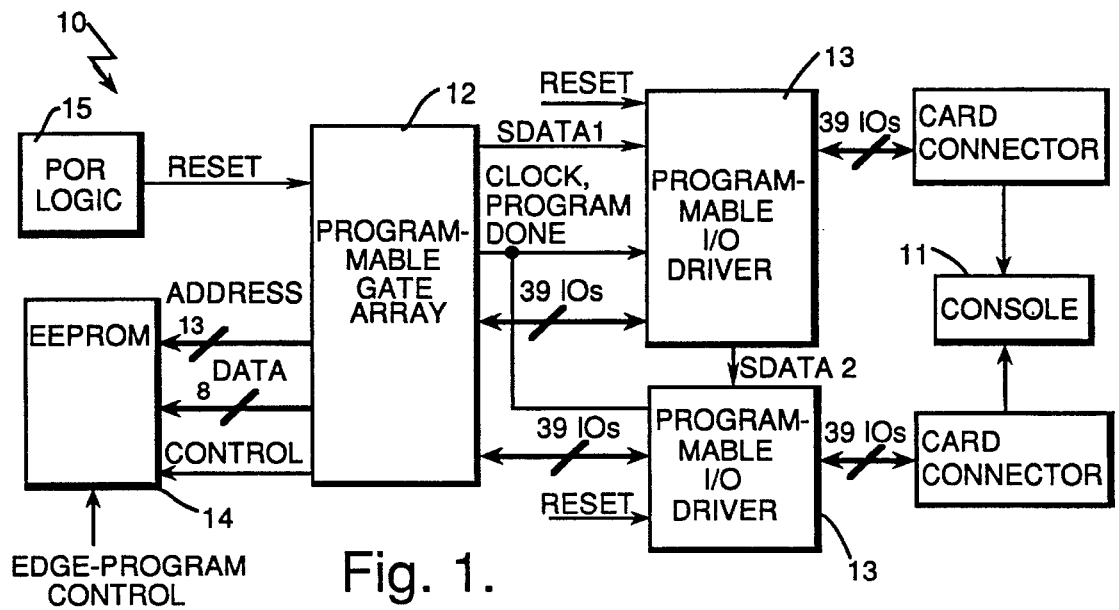
FIG. 1 shows a block diagram of a generic driver interface card in accordance with the principles of the present invention.

FIG. 1 shows a block diagram of a generic driver interface card 10 in accordance with the principles of the present invention that is adapted to be used in a UYA-4 display console 11, for example. The generic driver interface card 10 comprises a programmable gate array 12, such as a Xilinx programmable gate array, for example, at least one bidirectional programmable I/O driver (PIO) 13, such as a programmable I/O driver manufactured by Hughes Aircraft Company, for example, an EEPROM 14, such as an EEPROM manufactured by Xicor, for example, and power on reset logic circuitry 15. Two bidirectional programmable I/O drivers 13 are shown in FIG. 1 coupled to the programmable gate array 12. The programmable gate array 12 is a configurable program-driven logic device that is generally well known in the art. A complete description of the programmable gate array 12 is provided in a publication from Xilinx entitled "The Programmable Gate Array Data Book". The I/O signals of the programmable gate array 12 are connected to the bidirectional programmable I/O driver 13 to provide proper drive interface with the display console 11. The bidirectional programmable I/O driver 13 also functions as a programmable connector such that each I/O may be programmed independently to provide either an input or an output function.

A configuration program is stored in the EEPROM 14 and is loaded automatically into the programmable gate array 12 and the bidirectional programmable I/O driver 13 at power-up. EEPROM 14 edge programming capability is provided for the generic driver interface card 10 and is achieved in a conventional manner. The power on reset logic circuitry 15 resets the programmable gate array 12 and the bidirectional programmable I/O driver 13 to initialize loading of the configuration program. The power on reset logic circuitry 15 holds the reset of the programmable gate array 12 and the bidirectional programmable I/O driver 13 low until power is applied and stabilized. Table 1 shows the configuration data structure of the generic driver interface card 10 of FIG. 1.

TABLE 1

| Header | Identification |
| --- | --- |
| 11111111 | Dummy bit |
| 0010 | Preamble code |
| <24-bit length count> | Configuration program length |
| 1111 | Dummy bits (4 bits minimum) |
| PGA program data | |
| 0<PGA data frame #001>111 | N = number of data frames |
| 0<PGA data frame #002>111 | |
| 0<PGA data frame #003>111 | |
| 0<PGA data frame #004>111 | |
| : | |
| 0<PGA data frame #N−1>111 | |
| 0<PGA data frame #N>111 | |
| 1111 | Postamble code (4 bits minimum) |
| PIO driver #1 program data | PIO driver contains one |
| 0<PIO #1 data field>111 | START BITS '0', |
| 1111 | a 44-bit DATA FIELD, and 3 STOP BITS '1' |
| | Postamble code '1' (4 bits minimum) |
| PIO driver #2 program data | Daisy chain PIO data |
| 0<PIO #2 data field>111 | |
| 1111 | Postamble code '1'(4 bits minimum) |
| : | |
| PIO daisy chain data | |

Figure 2:
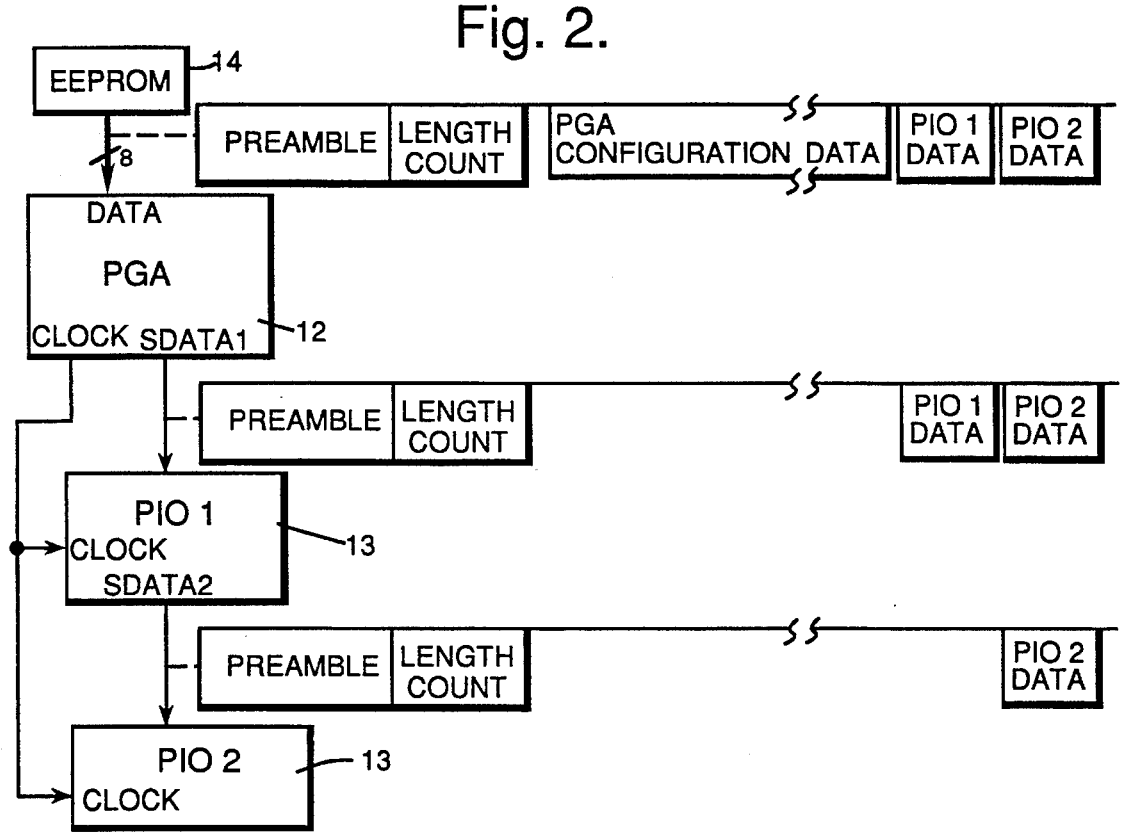
FIG. 2 illustrates the configuration loading of the data from EEPROM to programmable gate array and bidirectional programmable I/O drivers.

FIG. 2 illustrates the configuration loading of data from EEPROM 14 to the programmable gate array 12 and bidirectional programmable I/O driver 13. At power-up, a control signal from the programmable gate array 12 is sent to the EEPROM 14 to indicate the beginning of the configuration data loading into the programmable gate array 12 and bidirectional programmable I/O driver 13. Parallel configuration data from the EEPROM 14 is then serialized by the programmable gate array 12. The serial data, comprising preamble and length count, is sent to the two bidirectional programmable I/O driver 13 by way of SDATA1 and SDATA2 lines.

After the preamble and length count data have been loaded to the programmable gate array 12 and the bidirectional programmable I/O driver 13, the configuration data is loaded into an internal memory 16 of the programmable gate array 12. During the programmable gate array 12 configuration, the programmable gate array 12 data is transparent to the bidirectional programmable I/O driver 13. When the programmable gate array 12 configuration is done, the data is then loaded to the bidirectional programmable I/O driver 13. After all devices are configured, a PROGRAM DONE signal from the programmable gate array 12 goes active, signifying the configuration is done. The programmable gate array 12 and the bidirectional programmable I/O driver 13 then become operational.

The generic driver interface card 10 also incorporates the capability to edge-program the EEPROM 14 while it is on the card 10, to eliminate the need to remove the EEPROM 14 from the card 10. Consequently, the generic driver interface card 10 may be reconfigured easily by simply loading a new program to the EEPROM 14. When power is thereafter applied to the console 11, the new program will be loaded into the programmable gate array 12 and the bidirectional programmable I/O driver 13 to form a new personality for the generic driver interface card 10.

Figure 3A:
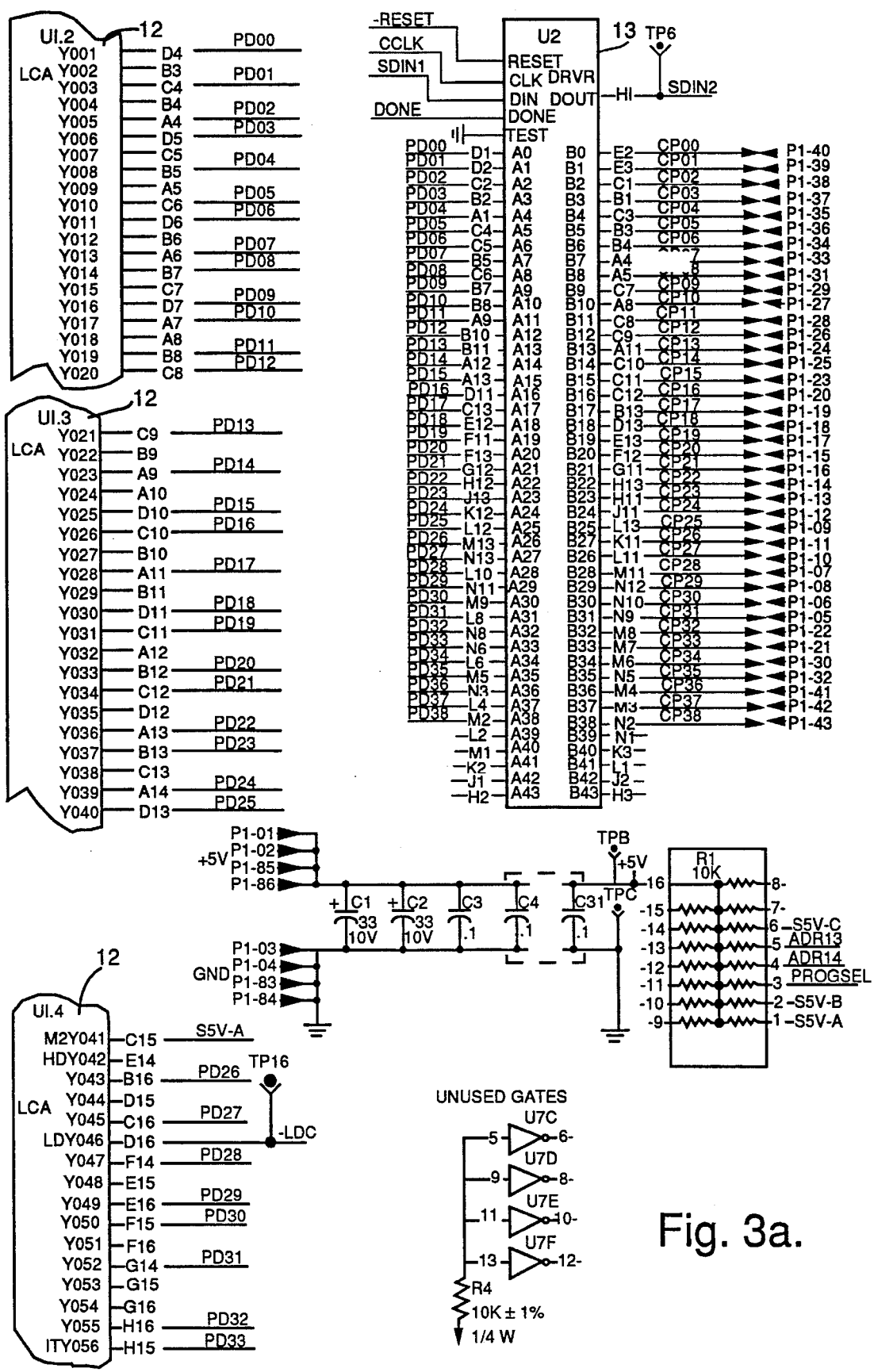
FIGS. 3a–3c show a detailed schematic of the genetic driver interface card of FIG. 1.
Figure 3B:
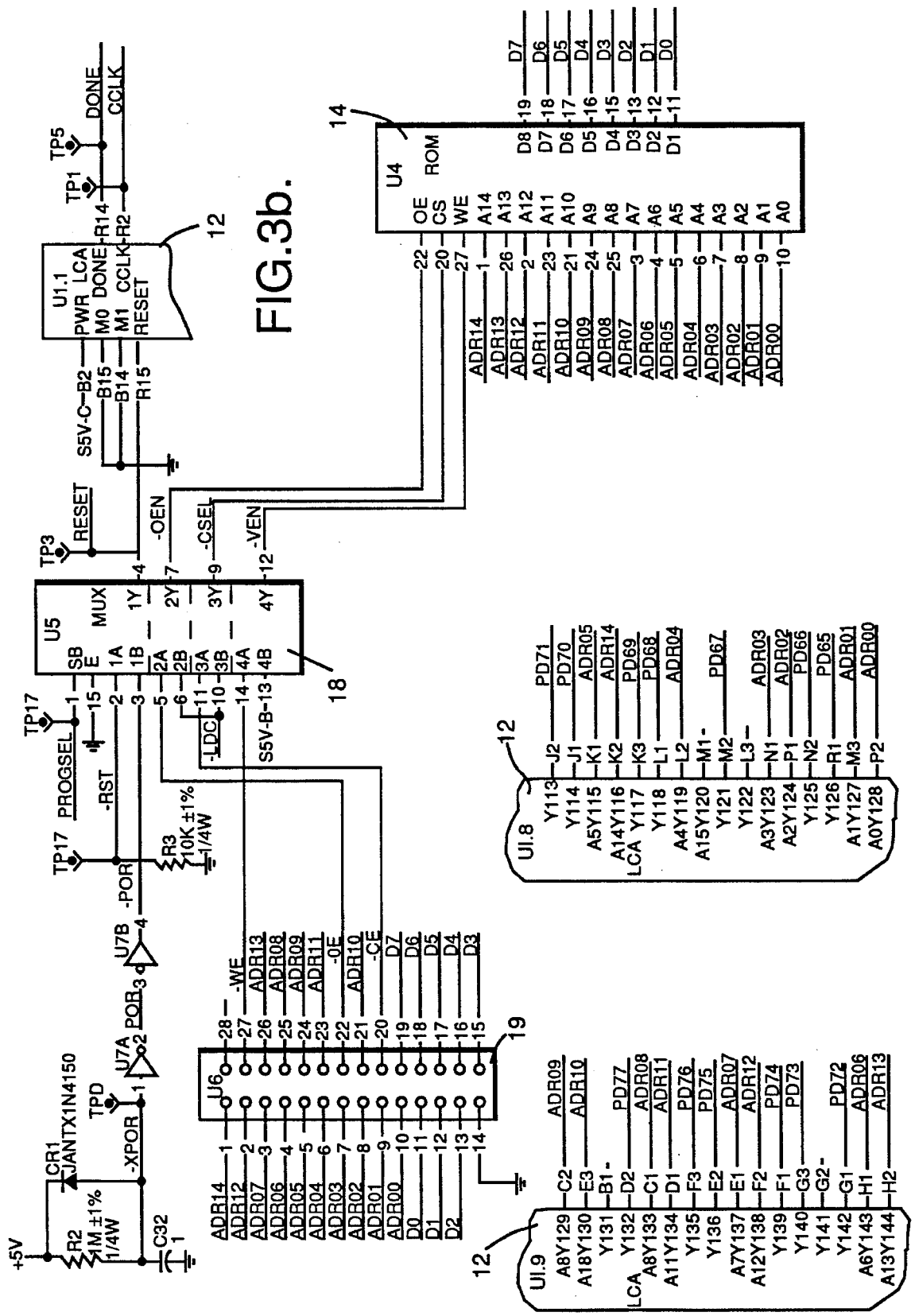
Figure 3C:
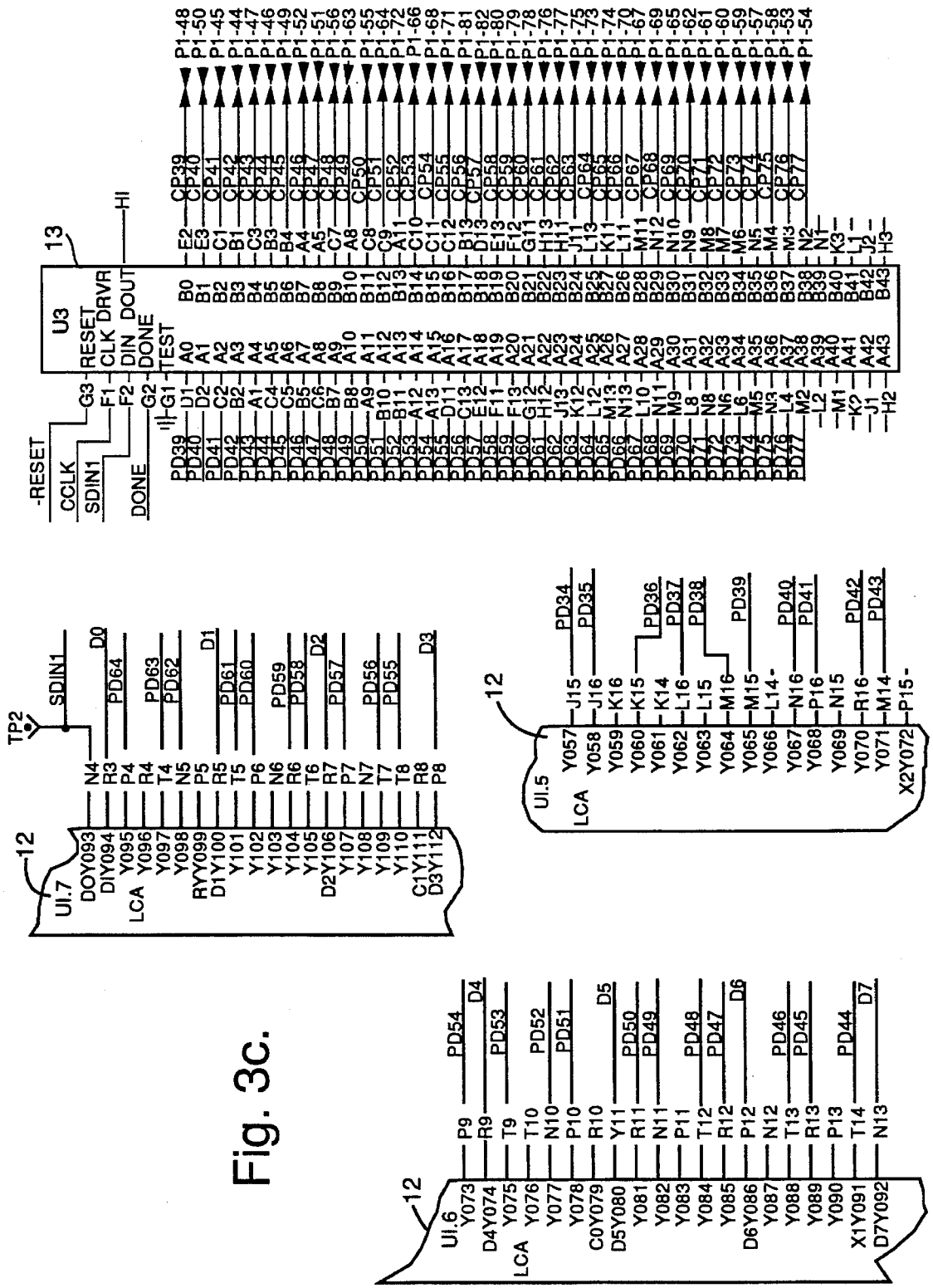

FIGS. 3a–3c show a derailed schematic of the generic driver interface card 10 of FIG. 1, indicating the interconnection of signal lines between each of the components. The circuit interconnections are self explanatory and should be readily understood by those skilled in the art. Consequently, a derailed discussion of the circuit of FIGS. 3a–3c will not be provided herein.

In FIGS. 3a–3c, in addition to the programmable gate array 12 and bidirectional programmable I/O driver 13, a multiplexer 18 is employed to select two modes of operation, and a programming socket 19 is employed to connect from a conventional PROM programmer (not shown) to the generic driver interface card 10. The multiplexer 18 and programming socket 19 are used to program the EEPROM 14. This programming is accomplished in a conventional manner well known to those skilled in the art.

In the normal mode, output enable (−OEN) and chip select (−CSEL) are controlled by the programmable gate array 12. In the program mode, the EEPROM 14 control signals come from the PROM programmer to the programming socket 19. The reset signal to the programmable gate array 12 and the bidirectional programmable I/O driver 13 is held low during the program mode. To program the EEPROM 14, the program mode is selected by placing a jumper across PROGSEL (TP-19) and GND (TP-C) and connecting signals from the PROM programmer to the programming socket 19. No jumpers are used in the normal operational mode of the generic driver interface card 10.

Figure 4:
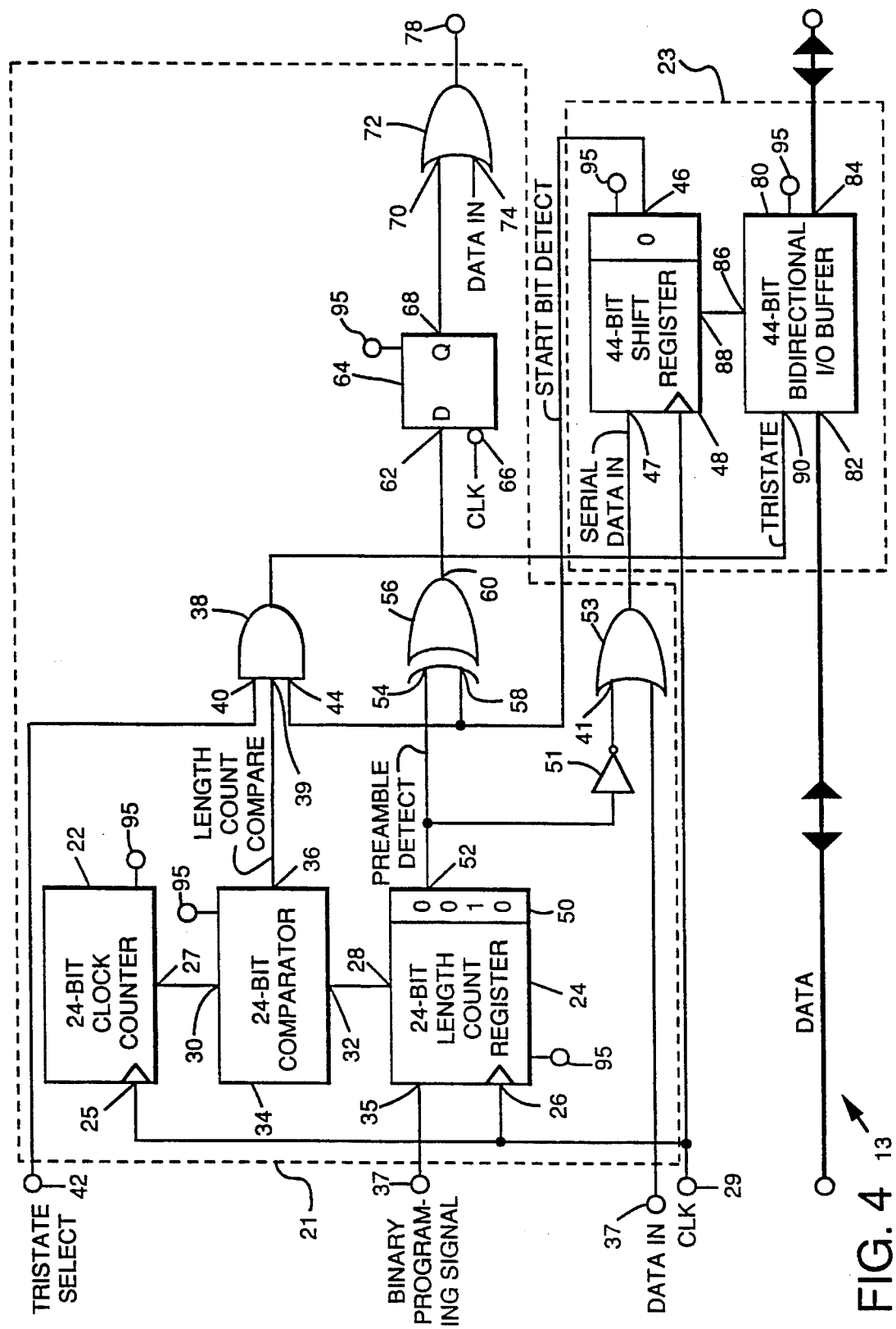
FIG. 4 illustrates a programmable bidirectional I/O driver employed in the generic driver interface card of the present invention.

FIG. 4 illustrates the details of the programmable bidirectional I/O driver 13 employed in the generic driver interface card 10 of the present invention. The driver 13 comprises a program control circuit 21, and a shift register and input/output (I/O) buffer circuit 23. The program control circuit 21 includes a twenty-four bit clock counter 22 and a twenty-four bit length count register 24. The counter 22 and the register 24 have clock signal inputs 25, 26, respectively, connected to receive an externally generated clock signal (CLK) provided at clock signal input terminal 29. The counter 22 and the register 24 have twenty-four bit parallel outputs 27, 28, respectively, connected to the parallel inputs 30, 32 of a twenty-four bit comparator 34. The register 24 has a serial data input port 35 connected to a programming signal input terminal 37 that is adapted to receive an externally generated serial binary coded programming signal.

An output 36 of the comparator 34 is connected to one input 39 of a three input AND gate 38. Another input 40 of the AND gate 38 is connected to a tristate select input terminal 42 and is adapted to receive an externally generated tristate select control signal. The third input 44 of the AND gate 38 is connected to the start bit detect signal output 46 of a forty-four bit direction control signal shift register 48 that is part of the shift register and input/output (I/O) buffer circuit 23. The shift register 48 includes a serial data input port 47 connected to the output of an OR gate 53. One input of the OR gate 53 is connected to a data input terminal 41.

The length count register 24 is provided with internal preamble signal detect logic 50 having an output 52 connected to one input 54 of an EXCLUSIVE OR gate 56 and the other input of the OR gate 53 by way of an inverter 51. Another input 58 of the EXCLUSIVE OR gate 56 is connected to the start bit detect signal output 46 of the shift register 48. An output 60 of the EXCLUSIVE OR gate 56 is connected to the data input (D) 62 of a D-type flip-flop 64. The flip-flop 64 has its clock input 66 connected to the clock input terminal 24 and its Q output 68 connected to one input 70 of a two input OR gate 72. The other input 74 of the two-input OR gate 72 is connected to the serial data input terminal 37. The output of the two input OR gate 72 is connected to a data output terminal 78.

The shift register and input/output (I/O) buffer circuit 23 also comprises an array of forty-four individual bidirectional I/O current drivers or buffers 80. The buffers 80 are bidirectional in that they can transmit data or other signals from low current drive logic elements connected to low level inputs 82 to high current drive elements connected to outputs 84 or, conversely, can transmit high level signals from high current elements connected to output terminals 84 to low level logic elements connected to inputs 82. The individual buffers 80 are conditioned to transmit signals in the selected forward or reverse direction by I/O buffer direction control signals. These signals are applied to individual ones of forty-four parallel I/O driver direction control signal inputs 86 that are connected to individual ones of forty-four parallel conductors of an output bus 88 of the shift register 48.

The I/O drivers 80 may also be selectively conditioned to operate in tristate mode by applying an appropriate tristate select control signal to a tristate select control signal input terminal 90. The counter 22, the register 24, the comparator 34, the shift register 48, the flip-flop 64, and the buffers 80 each have a reset input connected to a universal reset signal input terminal 95.

The configuration data structure for the driver 10 is presented below.

| HEADER | |
|---|---|
| 11111111 | Dummy Bits |
| 0010 | Preamble Code |
| <24 bit length count> | Configuration Program Length |
| 1111 | Dummy Bits |
| PGA PROGRAM DATA | (Optional) |
| 0<PGA Data Frame #001>111 | N Data Frames |
| 0<PGA Data Frame #002>111 | : |
| : | : |
| 0<PGA Data Frame #N>111 | : |
| 1111 | Postamble Code |
| I/O DRIVER DATA | |
| 0 | Start Bit |
| Data Field | Direction Control Data |
| 111 | Stop Bits |
| 1111 | Postamble Code |
| DAISY CHAIN DATA | |
| 0 | Start Bit |
| Data Field | Direction Control Data |
| 111 | Stop Bits |
| 1111 | Postamble Code |
| : | : |

In order to program the driver 13, in sequence, the header data is clocked into the length count register 24. The preamble detect output 52 of the register 24 is low and the output of the :inverter 51 is high. This causes all data one's to be loaded into the shift register 48 from the output of the OR gate 53.

When the header data is fully loaded into the length count register 24, the internal preamble detect logic 50 generates a preamble detect signal at its output terminal 52. The configuration data length count is locked into the length count register 24. The output of the inverter 51 goes to zero and the direction control data is loaded into the shift register 48 through the serial input port 47. When the programing data "0" start bit reaches the final stage of the shift register 48, a start bit detect signal is generated by internal logic within the shift register 48. The programming signal is applied to the data output terminal 78 of the driver 13 in response to the start bit detect signal and operation of the logic circuit comprised of the EXCLUSIVE OR gate 56, the flip-flop 64, and the OR gate 72.

Simultaneously, the clock count and length count become equal and the output of the comparator 36 goes high. This causes the tristate select control signal, previously blocked by AND gate 38 to be applied to tristate select control input terminal 90 of the shift register 48. Selection of tristate operation is controlled by the input to the tristate select input terminal 42. The programming data loaded into the buffers 80 remains fixed until the occurrence of a reset signal.

The genetic driver interface card 10 has been designed on a 5×7 circuit card for use in an UYA-4 console 11. However, the generic driver interface card 10 may also be implemented on other card formats (e.g. 5×5, for example), and thus there are many possible logic implementations of the genetic driver interface card 10. Depending upon the fore, at of the card 10, two or more bidirectional programmable I/O drivers 13 may be daisy-chained together to provide more I/O pairs, as is shown in FIG. 1. A fully functional genetic driver interface card 10 has been built and tested successfully in the UYA-4 console 11. The generic driver interface card 10 has been verified to emulate an older-generation UYA-4 digital card 10.

Thus, the present invention provides for a genetic driver interface card 10 that comprises a configurable digital circuit card. The generic driver interface card 10 has programmable logic functions and I/O connectors to provide the capability of implementing many new or old designs without re-etching the circuit card. The generic driver interface card 10 is a single versatile circuit card that may be used in many different applications.

The logic functions and I/O pins of the generic driver interface card 10 are programmable to allow emulation of old designs and implementation of new designs without the need to physically modify the card. This eliminates card layout and minimizes the design cycle for redesigned cards. The present invention provides for a single circuit card that is adapted to replace many circuit cards containing unprocurable parts, and therefore eliminates nonrecurring layout cost and shortens the design cycle.

The generic driver interface card 10 utilizes a bidirectional programmable I/O driver to provide a programmable connector with the high current drive capability required to interface with older-generation systems. The generic driver interface card 10 allows design changes without the need to physically modify the circuitry. A single generic driver interface card 10 can emulate many different old designs and may be used for new designs, whereas most circuit cards cannot change their personalities. The configuration program of the generic driver interface card 10 is stored in the EEPROM 14 which has edge-programmability to eliminate the need of removing the EEPROM 14 prior to programming.

The generic driver interface card is capable of replacing over 250 different existing older-generation digital card types without re-etching the circuit card in the UYA-4 consoles. In addition, new designs or design changes may be implemented easily with the generic driver interface card without nonrecurring engineering layout costs, which shortens the design cycle. The present invention provides for a tremendous cost savings from design to checkout and eliminates the card layout cycle. The generic driver interface card has been proven to emulate old designs in the UYA-4 consoles, and a new design is being implemented for this console. The generic driver interface card solves many problems resulting from the unavailability and unprocurability of parts, and may be used in the UYQ-21 console, for example, and many new and old applications.

Thus there has been described a new and improved configurable digital circuit card that may be used to provide a multiplicity of input and output functions. Clearly, numerous and varied other arrangements may be readily devised by those skilled in the art without departing from the scope of the invention.

What is claimed is:

1. A generic digital logic driver interface card for replacing an older generation digital logic circuit card operating at a high current drive level of older generation electronic equipment in an original card slot of said older generation digital circuit card, said generic digital logic driver interface card providing a configurable digital logic function for duplicating the logic function of said older generation digital circuit card at a low current drive level of present generation digital circuit cards and having configurable I/O drivers for interfacing with older generation I/O connections in the original card slot at the high current drive level of said older generation electronic equipment, said interface card comprising:

a programmable gate array operating at the low current drive level of present generation digital circuit cards and having a plurality of I/O signal lines;

a bidirectional programmable I/O driver having a plurality of I/O signal lines that couple the programmable gate array I/O signal lines to said original card slot, said bidirectional programmable I/O driver providing a selectable directional interface between said programmable gate array and said older generation electronic equipment, said bidirectional programmable I/O driver comprising means for transmitting logical data signals from a low current drive logic element connected to a low current level terminal of said I/O driver to a high current drive logic element connected to a high current level terminal of said I/O driver, and conversely to transmit logical data signals from said high current drive logic element through said high current level terminal to said low current level terminal and said low current drive logic element;

an EEPROM having a plurality of signal lines that are connected to the programmable gate array to provide data to said programmable gate array for programming said programmable gate array and said bidirectional programmable I/O driver, and power on reset logic circuitry for programming said programmable gate array and said bidirectional programmable I/O driver upon powering up of said generic digital logic driver interface card.

2. The generic driver interface card of claim 1 wherein the bidirectional programmable I/O driver comprises a programmable connector wherein each I/O line thereof is independently programmed to provide either an input or an output function.

3. The generic driver interface card of claim 1 wherein the EEPROM is edge programmable.

4. The generic driver interface card of claim 1 wherein a configuration program is stored in said EEPROM and is loaded automatically into the programmable gate array and bidirectional programmable I/O driver at powerup of said card, and the power on reset logic circuitry comprises means for resetting the programmable gate array and the bidirectional programmable I/O driver to initialize loading of the configuration program, said means for resetting holding the reset of the programmable gate array and the bidirectional programmable I/O driver low until power is applied and stabilized.

5. A generic digital logic driver interface card for interfacing a digital circuit card operating at a low current drive level with a digital circuit card slot having I/O connections operating at a high current drive level, said generic driver interface card providing a configurable digital logic function operating at the low current drive level and having configurable I/O drivers for interfacing with the I/O connections card slot at the high current drive level, said interface card comprising:

a programmable gate array operating at the low current drive level and having a plurality of I/O signal lines;

a bidirectional programmable I/O driver having a plurality of I/O signal lines that couple the programmable gate array I/O signal lines to said card slot, and bidirectional programmable I/O driver providing a selectable directional interface between said programmable gate array and said I/O connections of said card slot, said bidirectional programmable I/O driver comprising means for transmitting logical data signals from a low current drive logic element connected to a low current level terminal of said I/O driver to a high current drive logic element connected to a high current level terminal of said I/O driver, and conversely to transmit logical data signals from said high current drive logic element through said high current level terminal to said low current level terminal and said low current drive logic element;

an EEPROM having a plurality of signal lines that are connected to the programmable gate array to provide data to said programmable gate array for programming said programmable gate array and said bidirectional programmable I/O driver; and power on reset logic circuitry for programming said programmable gate array and said bidirectional programmable I/O driver upon powering up of said generic digital logic driver interface card.

6. The generic driver interface card of claim 5 wherein the bidirectional programmable I/O driver comprises a programmable connector wherein each I/O line thereof is independently programmed to provide either an input or an output function.

7. The generic driver interface card of claim 5 wherein the EEPROM is edge programmable.

8. The generic driver interface card of claim 5 wherein a configuration program is stored in said EEPROM and is loaded automatically into the programmable gate array and bidirectional programmable I/O driver at powerup of said card, and the power on reset logic circuitry comprises means for resetting the programmable gate array and the bidirectional programmable I/O driver to initialize loading of the configuration program, said means for resetting holding the reset of the programmable gate array and the bidirectional programmable I/O driver low until power is applied and stabilized.

9. A generic digital logic driver interface card for replacing an older generation digital logic circuit card operating at a high current drive level of older generation electronic equipment in an original card slot of said older generation digital circuit card, said generic digital logic driver interface card providing a configurable digital logic function for duplicating the logic function of said older generation digital circuit card at a low current drive level of present generation digital circuit cards and having configurable I/O drivers for interfacing with older generation I/O connections in the original card slot at the high current drive level of said older generation electronic equipment, said interface card comprising:

a programmable gate array operating at the low current drive level of present generation digital circuit cards and having a plurality of I/O signal lines;

a bidirectional programmable I/O driver circuit having a plurality of bidirectional I/O drivers that respectively couple corresponding ones of the programmable gate array I/O signal lines to said original card slot, said bidirectional programmable I/O driver circuit providing a selectable directional current buffer interface between low current drive logic elements comprising said programmable gate array and high current drive logic elements comprising said older generation electronic equipment, each said bidirectional I/O driver comprising a low current level terminal, a high current level terminal, and bidirectional buffer circuit means connected to said high current level terminal and said low current level terminal for transmitting logical data signals from a low current drive logic element comprising said programmable gate array and connected to said low current level terminal to a high current drive logic element comprising said older generation electronic equipment connected to said high current level terminal, and conversely to transmit logical data signals from said high current drive logic element through said high current level terminal to said low current level terminal and said low current drive logic element;

an EEPROM having a plurality of signal lines that are connected to the programmable gate array to provide data to said programmable gate array for programming said programmable gate array and said bidirectional programmable I/O driver; and power on reset logic circuitry for programming said programmable gate array and said bidirectional programmable I/O driver Upon powering up of said generic digital logic driver interface card.

* * * * *